May 6, 1958     H. J. BARRECA     2,833,453
UTILITY RACKS
Filed April 5, 1956     2 Sheets-Sheet 1
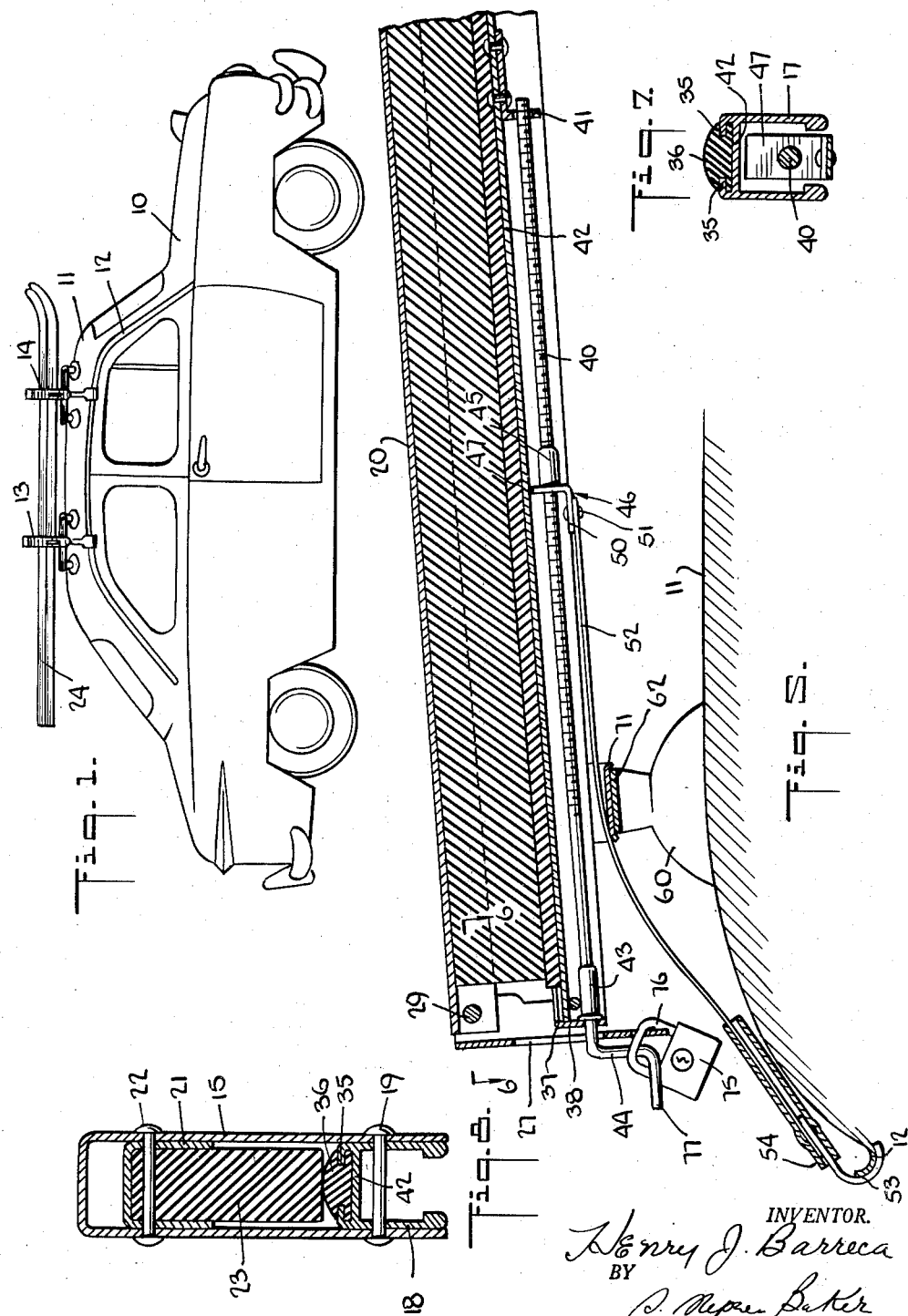
INVENTOR.
Henry J. Barreca
BY
ATTORNEY May 6, 1958
H. J. BARRECA
UTILITY RACKS
2,833,453
Filed April 5, 1956
2 Sheets-Sheet 2
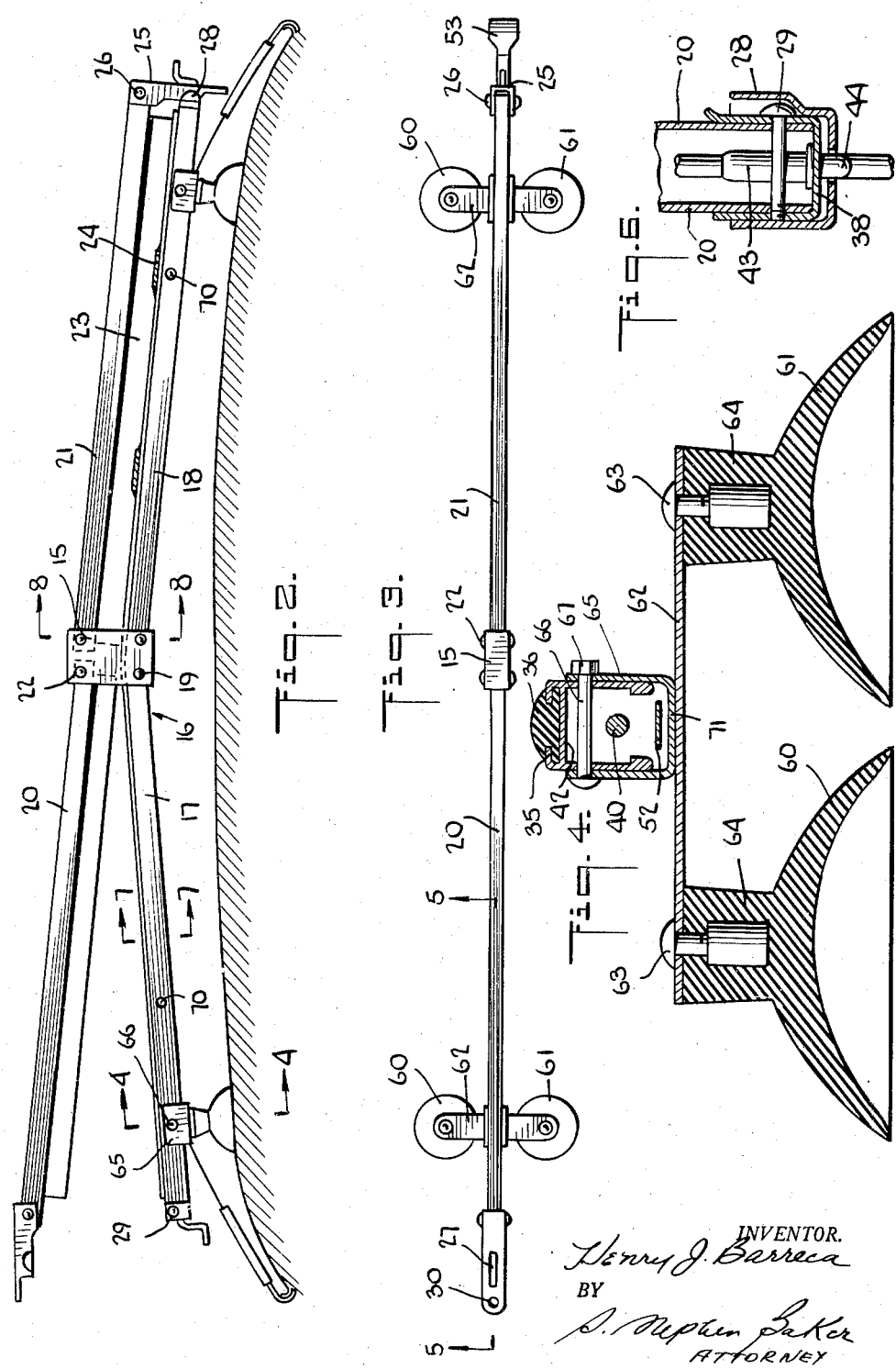

United States Patent Office 2,833,453
Patented May 6, 1958

2,833,453

UTILITY RACKS

Henry J. Barreca, Brooklyn, N. Y.

Application April 5, 1956, Serial No. 576,359

9 Claims. (Cl. 224—42.1)

This invention relates to utility racks such as ski racks as conventionally used on the tops of automobiles.

A serious objection found in conventional racks is the difficulty of securely attaching the rack to the automobile top and the consequent tendency of the rack to shift when the automobile is moving at a high rate of speed. In fact, blowing off of the rack from the car is not an uncommon occurrence. Conventional racks generally employ heavy canvas straps and buckles and the user pulls upon an end of the strap so as to tighten and secure the rack to the car. For proper installation, this operation requires considerable strength on the part of the user and the mechanism is generally awkward to maneuver.

The rack of this invention improves upon prior racks in a variety of manners including the fact that it can be simply yet effectively connected to the top of the car with such stability as to practically eliminate any chance of accidental displacement. Very little strength is required in the mounting process although the rack is held on to the top of the car with extreme strength. Further, no canvas or any other fabric straps ar employed and the mechanism is long lasting and positive in operation.

The rack of this invention has other important advantages such as employing the tightening device which secures the rack to the car, as a locking member for holding the rack in closed position. Furthermore, means are provided for applying a padlock or the like to the closure members of the rack without requiring any additional mechanism and whereby the rack can be maintained closed against theft of the skis or other articles held thereby.

The invention will be further understood from the following description and drawings in which:

Figure 1 is a side view of an automobile equipped with the rack of this invention, illustrated and hereinafter described as a ski rack;

Figure 2 is an enlarged front view of one of the main rack members;

Figure 3 is a top plan view thereof;

Figure 4 is an enlarged cross-sectional view as taken along the line 4—4 of Figure 2;

Figure 5 is an enlarged cross-sectional view as taken along the line 5—5 of Figure 3 but showing a fragmentary portion of the ski rack as attached to an automobile top and the locking member secured in closed position by a padlock;

Figure 6 is a cross-sectional view as taken along the line 6—6 of Figure 5;

Figure 7 is an enlarged cross-sectional view as taken along the line 7—7 of Figure 2; and Figure 8 is an enlarged cross-sectional view as taken along the line 8—8 of Figure 2.

The automobile 10 is of conventional form and has the usual roof 11. The sides of the roof 11 are provided with the usual rain gutter 12. It is to this rain gutter 12 that the rack members are connected as is common in the art.

The ski rack comprises a pair of main rack members 13 and 14 which, as is usual, are spaced along the top of the roof. Each of the rack members is of the form disclosed in Figure 2.

In the center of the rack member is disposed an inverted U-shaped bracket 15. An elongated lower channel 16 having the legs 17 and 18 is connected at its center to bracket 15 as by bolts 19. Legs 17 and 18 are integral and are in angular relationship to each other, the angle being about 165 degrees. It will be recognized that the reason for such angular relationship is to conform approximately to the usual convex top of the auto roof 11.

Each rack member comprises a pair of upper channels 20 and 21 which are pivoted to the top of bracket 15 as by the pivots 22 and jointly constituting an elongated upper member. Referring first to the construction of the upper channels 20 and 21 it may be noted as follows:

Channels 20 and 21 are elongated and of inverted U-shape. Disposed in each channel and extending outwardly therefrom is the rubber pressure strip 23 which applies holding pressure to the ski 24 as illustrated in Figure 2. In actual practice, the rack holds about six pairs of skis, three pairs on each side.

The outer end of the upper channels is provided with a locking bracket 25 which is pivoted to the channel by pivot 26. Locking bracket 25 is itself channel-shaped and it swingably embraces the end of the upper channel. In normal or closed position, it extends downwardly from the upper channel and it is formed with an elongated vertical opening 27 in its front face. In its downward or closed position, lower ends of the sides of the bracket 25 embrace the end of the lower channels as illustrated in Figure 2. In the form shown, the sides of bracket 25 are formed with a concavo-convex protuberance 28 in order to accommodate an end bolt 29 disposed at the outer end of the lower channel. Locking bracket 25 is further formed with a hole 30 at its lower end as illustrated in Figure 3, such hole 30 serving as means for locking the ski rack positively so as to prevent theft of the skis or any other article maintained in the rack as will be hereinafter described.

The construction of the lower channels 17 and 18 will now be described.

The lower channels are also elongated and of substantially inverted U shape, save that their upper ends are formed with mutually inwardly facing lips 35 defining a shallow upper channel. Such upper channel is provided with an elongated buffer strip 36 of somewhat resilient material such as vinyl plastic or the like. Side grooves are formed in the strip 36 and the strip is then slid into place so that the lips 35 engage the grooves and maintain the strip 36 against accident displacement. The function of the strips 36 is to offer a relatively soft and non-scratching surface against which the skis are pressed. The outer end of the lower channels is provided with an end cap 37 through the sides of which the bolt 29 is disposed and by which the cup is connected to the lower channel. The front face 38 of end cap 37 is provided with an opening which serves as a bearing for the actuating crank as will hereinafter be described.

Rack tightening mechanism is disposed on the underside of the lower channel members 17 and 18. Each of such lower channels is provided with a complementary tightening system each disposed on opposite sides of the lower channel arrangement. Such system comprises an elongated threaded shaft 40 journalled at the inner end thereof in bracket 41 secured to and depending from the underside of roof 42 of the lower channel. The outer end of shaft 40 is similarly journalled in the front face 38 of end cap 37 by simply extending through the hole 30 thereof. A collar 43 clamped on the outer end of shaft 40 maintains the shaft in position and bears against the end cap.

The outer end of shaft 40 is terminated in an integral crank handle 44 which is manually accessible so that the shaft 40 may be conveniently rotated. A threaded tubular follower 45 which is formed with an integral bracket 46 is engaged by the threaded shaft 40 for the usual follower action. Bracket 46 is angular and has its upper leg 47 integral with the follower 45 and of substantially rectangular configuration as illustrated in Figure 7 so that it is complementary in shape to that of the lower channel 17 so as to prevent turning of the follower 45. Furthermore, the upper leg 47 maintains the shaft 40 spaced from the roof 42 of the lower channel.

To the lower arm 50 of bracket 46 is connected as by bolt 51, a resilient band metal strap 52, the outer end of which terminates in an inwardly directed hook 53. In mounting the rack, hook 53 is applied around the rain gutter 12 as illustrated in Figure 5. In order to protect the finish of the car, a sleeve 54 of rubber or resilient plastic or the like is slipped over the strap 52 near its hook end.

In order to maintain the ski rack members spaced above the automobile top as is conventional, a plurality of suction cup supports are provided. It will be understood that such suction cup supports are merely representative of any type of support and that the essential elements of the invention may be realized without using a support. However, in the form shown, the suction cup support is illustrated in Figure 4 and comprises a pair of rubber suction cups 60 and 61 of substantially conventional form connected together by metal link 62 at the ends of which are disposed bolts 63 having enlarged inner ends which are embedded in the rubber stems 64 of the suction cups. It may be observed that the heads of bolts 63 are not slotted but are rounded and secured tightly against link 62 so as to discourage theft of the rack and its contents by unscrewing the bolts.

Disposed on link 62 is an upstanding U-shaped channel member 65 having a hole in each side wall thereof so that it may receive the bolt 66 which is tightened by the nut 67. It will be noted in Figure 2 that the lower channels are provided with openings 70, two sets of such openings being on each lower channel. In Figure 2 the channel member 65 is shown as being connected to the front or outer sets of openings 70 by means of the bolts 66. The purpose of providing multiple openings 70 is to permit accommodation of the ski rack for different sized automobiles, i. e., a small automobile usually requiring the suction cups to be disposed at the inner openings. Strap 52, it will be noted in Figures 4 and 5, extends between the floor 71 of channel member 65 and the roof 42 of the lower channel member. Thus, the strap 52 is supported above the suction cups.

It will be observed that the front portion of the strap, i. e., that portion between floor 71 and bracket 46, is maintained parallel to the shaft 40 while floor 71 acts somewhat as a fulcrum in respect to the tension of the strap. Thus, the strap would ordinarily tend to pull the shaft out of the channel by bowing it downwardly and thereby buckling and possibly bending it completely out of shape. However, because of the shown construction, the shaft is actually urged upwardly into the lower channel. The roof of the channel prevents overbending in this direction.

Each rack member is provided with two pairs of suction cups as is conventional.

The rack of this invention is employed as follows:

After the suction cups have been disposed in the desired openings 70, and the bolts 66 tightened, the cranks 44 are turned so that the follower 45 approaches the outer end of the shaft 40 so that the straps are in a relatively long or outward position. The straps should be of about the same length. The hooks 53 are then secured around the rain gutters 12 and the cranks 40 are then rotated to tighten the hooks upon the rain gutters. It is considered unnecessary to use water or grease on the suction cups since the straps achieve such a strong connection as to render the action of the suction cups relatively unnecessary except as a spacing medium. As the cranks 40 of each tightening system are rotated, the straps 52 effect a grip of immense strength on the rain gutters. In fact, it is desirable not to over-tighten the straps as otherwise the rain gutter may be distorted. Thus, it can be seen that the rack is capable of an extraordinary grip upon the rain gutter notwithstanding the simplicity of installment relative to conventional systems which require canvas straps to be pulled to desired tightness.

After both ski rack members have been installed, the skis 24 (or other articles) may be disposed along the strips 36 as is conventional and the upper channel members 20 and 21 brought down so that the rubber blocks or srtips 23 press against the skis. The locking bracket 25 is then swung downwardly so that the protuberances 28 engage the bolts 29 and thus clamp the skis between the upper and lower channel members. It is necessary, in order to bring down the locking bracket into locking position, that the crank handle 28 be in the upward position illustrated in Figure 2 as otherwise the locking bracket cannot clear the crank handle. However, by disposing the crank handle in the upward position illustrated in Figure 2, the vertical, elongated slot 27 will perimt the crank handle 28 to protrude therethrough to permit the full downward movement of the locking bracket. Thereafter, and in order to complete the locking procedure, the crank handle 44 is swung downwardly as illustrated in Figure 5. Thus, the crank handle 28 will prevent return of the locking bracket 25 to an upper position and thus locks the skis in place. It can be recognized, therefore, that the crank handle 28 serves at least a dual function, i. e., actuation of the shaft 40 and serves as a locking tongue for the locking bracket 25. It will further be observed that the crank handle 44 extends through slot 27 at the bottom end of the slot as illustrated in Figure 5. This permits the crank handle to be swung upwardly where it can clear the slot 27 when the locking bracket 25 is to be disengaged.

If further locking so as to prevent theft is desired, a padlock 75 may be employed by inserting its shackle 76 through both the opening 30 and around the outwardly extending stem 77 of the crank handle 28 as illustrated in Figure 5. This will prevent the locking bracket from being raised to non-locking position since the crank handle must be accordingly raised to an upward position to permit this and the padlock will restrain such action.

There has been shown what is now considered a preferred embodiment of the invention but it is obvious that changes and omissions may be made without departing from its spirit.

What is claimed is:

1. A ski rack for automobile tops comprising an elongated lower member and an elongated upper member adapted to clamp skis under pressure between said upper and lower members, tightening means including an operating handle disposed on said lower member, said tightening means further including a strap extending outwardly of said lower member and means to vary the effective length of said strap, a hook on the outer end of said strap for securing the strap to the rain gutter of an automobile top, an end locking bracket pivotally disposed on one of said members and adapted to embrace the other member for locking said members together, said locking bracket being formed with an opening therein, said operating handle extending through said opening and being adjustable to a first position where said locking bracket is prevented from disengaging said other member and to a second position where said bracket may be disengaged from said other member with said operating handle clearing said slot during said disengagement.

2. A ski rack according to claim 1 and wherein said locking bracket is further formed with a hole which is adjacent to said operating handle in the disengagement preventing position thereof whereby the shackle of a padlock may be passed through said hole and around said handle so as to prevent said handle from being adjusted to its said second position.

3. A utility rack for automobile tops comprising an elongated lower member and an elongated upper member secured to said lower member and adapted to clamp articles under pressure between said upper and lower members, and means for connecting said lower member to the rain gutter of an automobile top, said means comprising an elongated rotatable threaded member on at least one side of said lower member, a threaded follower on said threaded member and movable longitudinally in response to rotation of said threaded member, a strap connected to said follower whereby rotation of said threaded member adjusts the tension of said strap, a hook on the outer end of said strap, said lower member being an inverted U-shaped channel member and said rotatable threaded member comprising a shaft extending within and lengthwise of the channel of said lower member, means on both ends of said shaft maintaining said shaft ends in said lower member channel, and rack supporting members adapted to support said lower member above the top of the car, said strap extending from said follower to said hook and resting upon one of said rack supporting members so as to maintain the portion thereof between said rack supporting member and said follower substantially parallel to said shaft.

4. A utility rack for automobile tops comprising an elongated lower member and an elongated upper member secured to said lower member and adapted to clamp articles under pressure between said upper and lower members, and means for connecting said lower member to the rain gutter of an automobile top, said means comprising an elongated rotatable threaded member on at least one side of said lower member, a threaded follower on said threaded member and movable longitudinally in response to rotation of said threaded member, a strap connected to said follower whereby rotation of said threaded member adjusts the tension of said strap, a hook on the outer end of said strap, said lower member being an inverted U-shaped channel member and said rotatable threaded member comprising a shaft extending within and lengthwise of the channel of said lower member, means on both ends of said shaft maintaining said shaft ends in said lower member channel, and strap supporting means between the ends thereof for maintaining the inner end of said strap substantially parallel to said shaft.

5. A utility rack for automobile tops comprising an elongated lower member and an elongated upper member secured to said lower member and adapted to clamp articles under pressure between said upper and lower members, and means for connecting said lower member to the rain gutter of an automobile top, said means comprising a rotatable threaded member on at least one side of said lower member, a threaded follower on said threaded member and movable longitudinally in response to rotation of said threaded member, a strap connected to said follower whereby rotation of said threaded member adjusts the tension of said strap, a hook on the outer end of said strap, said lower member being an inverted U-shaped channel member, said rotatable threaded member comprising a shaft extending within and lengthwise of the channel of said lower member, a locking bracket pivoted to the outer end of said upper member and adapted to engage the outer end of said lower channel member so as to lock the articles in clamped position between the upper and lower members, and a manually actuated crank handle on the outer end of said threaded shaft for rotating said shaft, said locking bracket being formed with a slot for accommodating the penetration of said crank handle through said locking bracket when said locking bracket is disposed in its said lower channel member end embracing position.

6. A rack according to claim 5 and wherein said locking bracket slot is vertical, said crank handle extending through said slot at the lower end of the slot, and being swingable to an upward position where disengagement of the locking bracket from the lower channel member may be effected with the crank handle being accommodated by the slot, and said crank handle being swingable to a lower position so as to lock said locking member against pivoting and thereby prevent disengagement of said locking member from said lower channel member.

7. A rack according to claim 6 and wherein the extreme lower end of said locking bracket is formed with an opening therethrough and adjacent said crank handle, in its lower, locking position whereby the shackle of a padlock may be passed through said lower bracket opening and around said crank handle so as to prevent the upward disposition of said crank handle and prevent the locking bracket from being released from its lower channel member embracing position.

8. A rack according to claim 6 and including rack spacing members connected to said lower channel member and adapted to support the lower channel member above the top of the car, said strap extending between said lower channel member and said spacing and supporting members.

9. A rack according to claim 8 and wherein said lower channel member is formed with an upper shallow channel, and a resilient strip disposed in said shallow channel and adapted to support skis on said lower channel member.

References Cited in the file of this patent

UNITED STATES PATENTS

| | | |
|---|---|---|
| 2,575,458 | Merrill | Nov. 20, 1951 |
| 2,624,497 | Newman | Jan. 6, 1953 |
| 2,630,257 | Nielsen | Mar. 3, 1953 |
| 2,639,848 | Burmeister | May 26, 1953 |